United States Patent [19]
Seaberg et al.

[11] Patent Number: 5,417,464
[45] Date of Patent: May 23, 1995

[54] SLIP-CORRECTING LOAD-CLAMPING SYSTEM

[75] Inventors: Richard D. Seaberg, Brush Prairie; Jeffrey R. Skinner, Vancouver, both of Wash.

[73] Assignee: Cascade Corporation, Portland, Oreg.

[21] Appl. No.: 178,121

[22] Filed: Jan. 6, 1994

Related U.S. Application Data

[63] Continuation-in-part of Ser. No. 165,948, Dec. 10, 1993, abandoned.

[51] Int. Cl.$^6$ .......................... B66C 1/42; B25J 19/02
[52] U.S. Cl. ..................... 294/88; 294/907; 414/730; 901/46
[58] Field of Search .................. 294/88, 907, 106; 901/32, 33, 37, 46; 414/621, 730

[56] References Cited

U.S. PATENT DOCUMENTS

| | | |
|---|---|---|
| 3,171,549 | 3/1965 | Orloff .......................... 294/106 X |
| 3,904,234 | 9/1975 | Hill et al. . |
| 4,431,365 | 2/1984 | Sturtz, Jr. .................... 414/730 |
| 4,605,354 | 8/1986 | Daly . |
| 4,621,331 | 11/1986 | Iwata . |
| 4,637,736 | 1/1987 | Andeen et al. . |
| 4,725,826 | 2/1988 | Hunter . |
| 4,783,106 | 11/1988 | Nutter . |
| 5,292,219 | 3/1994 | Merin et al. . |

FOREIGN PATENT DOCUMENTS

| | | |
|---|---|---|
| 443998 | 8/1991 | European Pat. Off. . |
| 2636473 | 2/1978 | Germany . |
| 3245715 | 9/1983 | Germany . |
| 226827 | 9/1985 | Germany .......................... 901/46 |
| 48-35559 | 5/1973 | Japan . |
| 48-36849 | 5/1973 | Japan . |
| 52-33253 | 3/1977 | Japan . |
| 53-44744 | 12/1978 | Japan . |
| 1252168 | 8/1986 | U.S.S.R. ............................ 901/46 |

OTHER PUBLICATIONS

M. Ueda et al., "Sensors in Systems Necessary for Industrial Robots in the Near Future," Dept. of Electrical Engineering, Nagoya University, Nagoya, Japan, Nov. 1974, pp. 79–88.

R. Tomovic et al., "Multi-Functional Terminal Device with Adaptive Grasping Force," Automatica, Pergamon Press, vol. 11, 1975, pp. 567–570.

J. Kallhammer, "Incipient Slip Detection Using a Tactile Sensor," Dept. of Electrical Engineering, Duke University, Durham, North Carolina, 1985.

D. Brown et al., "Design and Implementation of a Computer-Controlled Sensor-Equipped Robot End Effector," North-Holland Computers in Industry, vol. 11, 1988, pp. 119–133.

P. Merin, "How Mechantronic Engineering Led to Intelligent Paper Roll Clamps," TAPPI Proceedings, 1993 Finishing and Converting Conference, 1993, pp. 63–70.

*Primary Examiner*—Dean Kramer
*Attorney, Agent, or Firm*—Chernoff, Vilhauer, McClung & Stenzel

[57] ABSTRACT

A load is gripped between a pair of load-engaging surfaces while the magnitude of any slippage between the load and the surfaces is variably sensed. A slip-correcting system variably predetermines an increase in the grip sufficient at least to decelerate the sensed magnitude of slippage, and the grip is automatically variably increased accordingly. Preferably, the magnitude of slippage sensed is a magnitude of relative movement between the load and the load-engaging surfaces, and preferably the magnitude of relative movement is a time-based magnitude such acceleration. The predetermined increase in the grip resulting from the sensed magnitude of slippage is preferably a predetermined increase in the proximity of the load-engaging surfaces, rather than any particular increase in the gripping force applied by the surfaces. A preferred fluid-powered embodiment of the clamp apparatus is disclosed for use on lift trucks in handling paper rolls and the like.

28 Claims, 8 Drawing Sheets

SLIP-CORRECTING LOAD-CLAMPING SYSTEM

CROSS-REFERENCE TO RELATED APPLICATION

This application is a continuation-in-part of U.S. patent application Ser. No. 08/165,948, filed Dec. 10, 1993 now abandoned.

BACKGROUND OF INVENTION

The present invention relates to a load-clamping system for gripping a load between a selectively closeable and openable pair of load-engaging surfaces and, more particularly, to such a clamp which automatically increases the grip of the load-engaging surfaces in response to the sensing of any slippage between the load and the surfaces.

Numerous types of systems for automatically varying gripping force have been proposed in the past for load handling clamps, whether of the electric-powered or fluid-powered type. These previous systems can generally be categorized as follows:

(1) systems which sense the existence of slippage and respond automatically by gradually increasing the gripping force on the load by fixed force increments until the sensed slippage stops;

(2) systems which gradually vary the gripping force in proportion either to the sensed weight or to the resistance to gripping of the load, without regard to whether or not slippage is actually occurring; and (3) systems which perform a combination of (1) and (2).

The first-mentioned category, wherein gripping force is increased gradually by fixed increments automatically in response to sensed slippage until the slippage stops, has been the most prevalent. The primary objective of such systems is to apply the minimum gripping force necessary to prevent slippage, to avoid undue deformation or other damage to the load. The problem, however, is that such systems can fail to achieve this objective because mere slippage detection, followed by gradual increases in gripping force until the slippage finally stops, provides an increase in grip which can be much too slow to prevent the load from slipping considerably and gaining significant slipping momentum, depending upon the application. In such case, an excessively high increase in gripping force, accompanied by resultant excessive load deformation and surface damage to the load, is eventually required to counteract the slipping momentum. Systems operating on this principle are disclosed in the following publications:

European Patent Publication No. 0443998A1, Aug. 28, 1991;

Japanese Patent Publication No. 48-35559, May 25, 1973;

Japanese Patent Publication No. 48-36849, May 31, 1973;

Japanese Patent Publication No. 52-33253, Mar. 14, 1977;

Japanese Patent Publication No. 53-44744, Dec. 1, 1978;

M. Ueda et al., "Sensors in Systems Necessary for Industrial Robots in the Near Future," Dept of Electrical Engineering, Nagoya University, Nagoya, Japan, November 1974, pp. 79–88;

R. Tomovic et al., "Multi-Functional Terminal Device with Adaptive Grasping Force," Automatica, Pergamon Press, Vol. 11, 1975, pp. 567–570;

J. Kallhammer, "Incipient Slip Detection Using a Tactile Sensor," Dept. of Electrical Engineering, Duke University, Durham, N.C., 1985;

D. Brown et al., "Design and Implementation of a Computer-Controlled Sensor-Equipped Robot End Effector," North-Holland Computers in Industry, Vol. 11, 1988, pp. 119–133.

P. Merin, "How Mechatronic Engineering Led to 'Intelligent' Paper Roll Clamps," TAPPI Proceedings, 1993 Finishing and Converting Conference, 1993, pp. 63–70.

Systems of the second category mentioned above gradually increase gripping force automatically in response to factors other than the concurrent sensing of slippage, although some of them sense the coefficient of friction between the load and the load-engaging surfaces by preliminary slip detection prior to lifting the load and later use this coefficient as a factor in quantifying the gripping force variations. None of these systems, however, can anticipate slippage caused by shock or other dynamic loading accurately enough to prevent it. Moreover, because they do not respond to the concurrent sensing of slippage after the load has been lifted, they cannot correct it. Examples of systems of this type are disclosed in the following publications:

German Patent Publication, No. 2636473, Feb. 23, 1978;

German Patent Publication, No. 3245715, Sep. 1, 1983;

U.S. Pat. No. 4,783,106, issued Nov. 8, 1988.

Systems of the third category mentioned above, which gradually increase the gripping force by fixed increments automatically in response both to the existence of slippage and to the sensed weight of the load, nevertheless cannot anticipate slippage caused by shock or other dynamic loading accurately enough to prevent it. When slippage does occur these systems, like the first category, can react too slowly for the particular application because of their reliance on the principle of incremental, gradual force correction. An example of this type of system is shown in U.S. Pat. No. 4,621,331, issued Nov. 4, 1986.

Previous fluid-powered slip correcting systems have mechanical shortcomings which further prevent them from reacting rapidly to the existence of slippage. For example, even though the system shown in the above-mentioned European Patent Publication No. 0443998A1 has been modified for commercial use by the addition of a pressurized fluid accumulator to improve its response to slippage, the system's fluid circuitry still detracts from its ability to respond quickly to slippage. This is due to several causes. One cause is the use of a relatively less responsive variably controlled relief valve to control gripping force, which valve wastefully depletes the accumulator's energy level by exhausting part of the accumulator fluid to the reservoir whenever the accumulator fluid is released to increase the grip. Other causes include the absence of continuously automatic recharging of the accumulator to maintain its energy level, necessary for repetitive responses to repetitive slip occurrences, and the exposure of the accumulator outlet to the remainder of the fluid circuitry which absorbs some of the energy of the accumulator's fluid output whenever the accumulator is activated.

SUMMARY OF THE INVENTION

The present invention overcomes the aforementioned deficiencies of prior load clamping systems by employing different basic principles of operation.

According to one aspect of the invention, not only the existence of slippage but also a magnitude of the slippage is sensed, which is responded to by immediately predetermining a variable increase in the grip sufficient at least to decelerate the sensed magnitude of slippage and immediately effecting such variable increase in grip so that the slippage is stopped before the slipping load gains momentum.

Preferably, such magnitude of slippage is sensed by measuring a magnitude of relative movement between the load and the load engaging surfaces. Although a time rate of such relative movement such as velocity and/or acceleration, or the distance of such relative movement, or the momentum thereof can each be sensed separately or in combination within the scope of the present invention to indicate the magnitude of slippage, the acceleration of the relative movement is the most desirable indicator of slippage magnitude because its magnitude can be sensed earlier than the magnitude of slippage movement or velocity, which thereby minimizes the time delay between slippage and the initiation of variable slippage correction.

A predetermined increase in grip resulting from the sensing of slippage can, within the scope of the present invention, be a predetermined increase in gripping force. However, according to another separate aspect of the invention, such predetermined increase in grip is instead preferably an increase in the proximity of the load-engaging surfaces limited by a predetermined maximum distance, without attempting to predetermine the increase in gripping force. Such predetermined maximum distance by which the proximity of the load-engaging surfaces is increased can, within the scope of the invention, be a fixed distance if merely the existence of slippage is sensed, but preferably such maximum distance is variably responsive to a sensed magnitude of slippage. This aspect of the invention is based on the realization that the load cannot be excessively deformed or damaged if the increase in proximity between the gripping surfaces is limited by a predetermined maximum distance, even though the increase in gripping force is not controlled. Thus, the force applied to increase the grip in response to slippage can be very high, thereby instantaneously overcoming the inertia of the clamp arms, actuators, and other system components to effect extremely quick gripping motion to stop the slippage, without risking damage. The predetermined distance by which the increase in proximity of the gripping surfaces is limited is preferably controlled by the timed actuation of a gripping actuator, but can be controlled alternatively within the scope of the invention by servo-control of the actuator with position feedback or otherwise.

The foregoing aspects of the present invention are applicable to gripping actuators of different types such as electrical, electromagnetic or fluid-powered. A preferred fluid power system capable of accomplishing the foregoing functions includes at least one fluid power actuator fed by a pressurized fluid accumulator, combined with fluid circuitry which minimizes the energy depletion of the accumulator and maximizes the effectiveness of its output to the actuator to increase the grip instantaneously. Preferably such fluid circuitry includes one or more of the following features: (1) an accumulator output valve openable only for a predetermined time period in response to the sensing of slippage to control the increase in grip by predetermining the volume of fluid flowing to the fluid-powered actuator, thereby limiting the increase in the proximity of the load-engaging surfaces without wastefully exhausting accumulator fluid through a relief valve; (2) continuously automatic accumulator fluid recharging circuitry; (3) isolation of the accumulator output from parallel, energy-absorbing, operator-controlled fluid circuitry; and (4) sharing of fluid conduits between the operator-controlled circuitry and the automatic slippage-correcting circuitry so as to minimize the number of fluid-power conduits required to operate the system.

Also, preferably, a slippage transducer is provided which includes a moveable load contact member and an electrical signal encoder mounted remote from each other and interconnected by a flexible mechanical connector to isolate the encoder from the load forces imposed on the moveable contact member.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
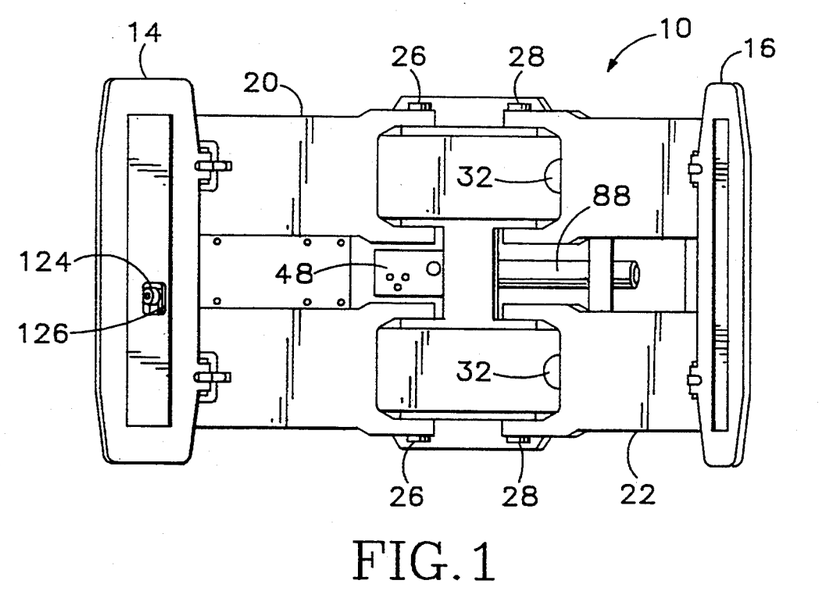
FIG. 1 is a front view of an exemplary embodiment of a fluid powered load handling clamp in accordance with the present invention.
Figure 2:
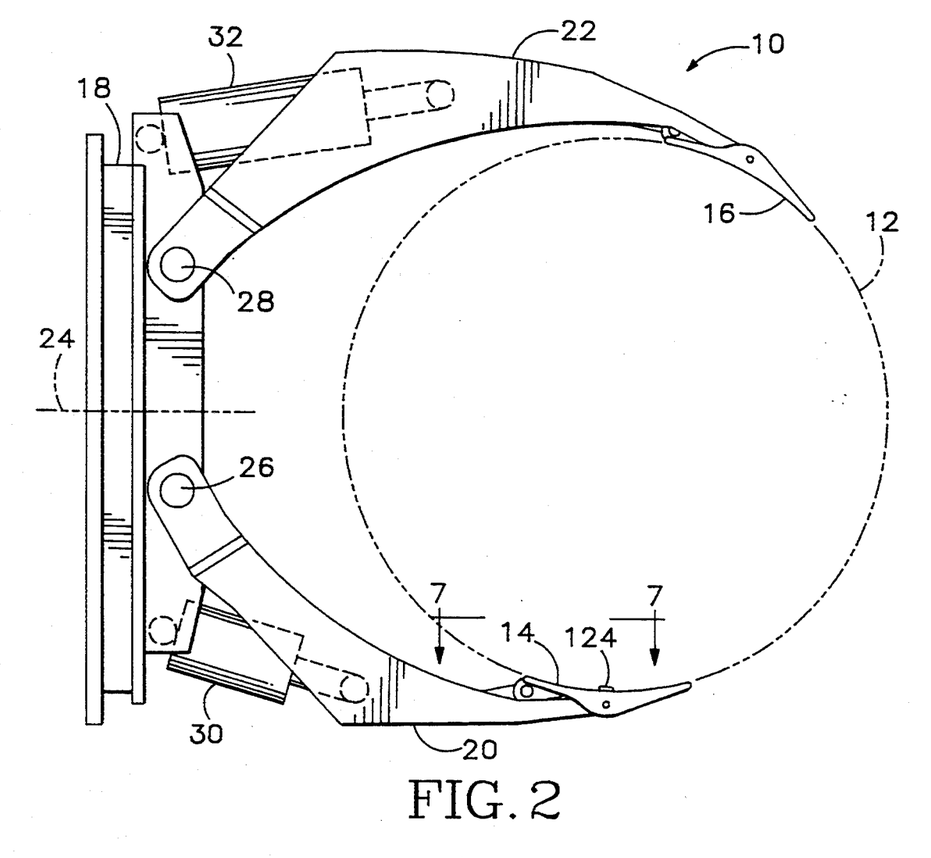
FIG. 2 is a top view of the load handling clamp of FIG. 1.

An exemplary embodiment of a load handling clamp in accordance with the present invention is indicated generally as 10 in FIGS. 1 and 2. The exemplary clamp 10 is a hydraulically-powered, pivoted-arm clamp adapted for mounting on a lift truck carriage which reciprocates vertically along a telescopic mast (not shown). The particular clamp 10 depicted in the drawings is for handling large paper rolls such as 12 used in the publishing and paper industries which, if deformed excessively as a result of overclamping to prevent slippage, will become too dynamically imbalanced for use on the high-speed printing presses or other machinery for which they are intended. On the other hand, under-clamping can cause the paper roll 12 to slip from the frictional grasp of the clamp 10, particularly when the load-engaging surfaces 14 and 16 of the clamp 10 are oriented vertically by the clamp's rotator 18 which rotates the load-engaging surfaces and their respective clamp arms 20 and 22 about an axis 24 (FIG. 2). Although the hydraulically operated paper roll clamp 10 is described herein as the preferred embodiment, the present invention is applicable to many other types of load clamps as well, regardless of the type of structure upon which the clamp is mounted, the type of load being handled, or the manner in which the clamp arms are powered. For example, clamps in accordance with the present invention could alternatively have sliding rather than pivoted arms, be electrically rather than hydraulically-powered, be mounted on non-vehicular rather than vehicular structures, and handle rectilinear rather than round loads.

Figure 3:
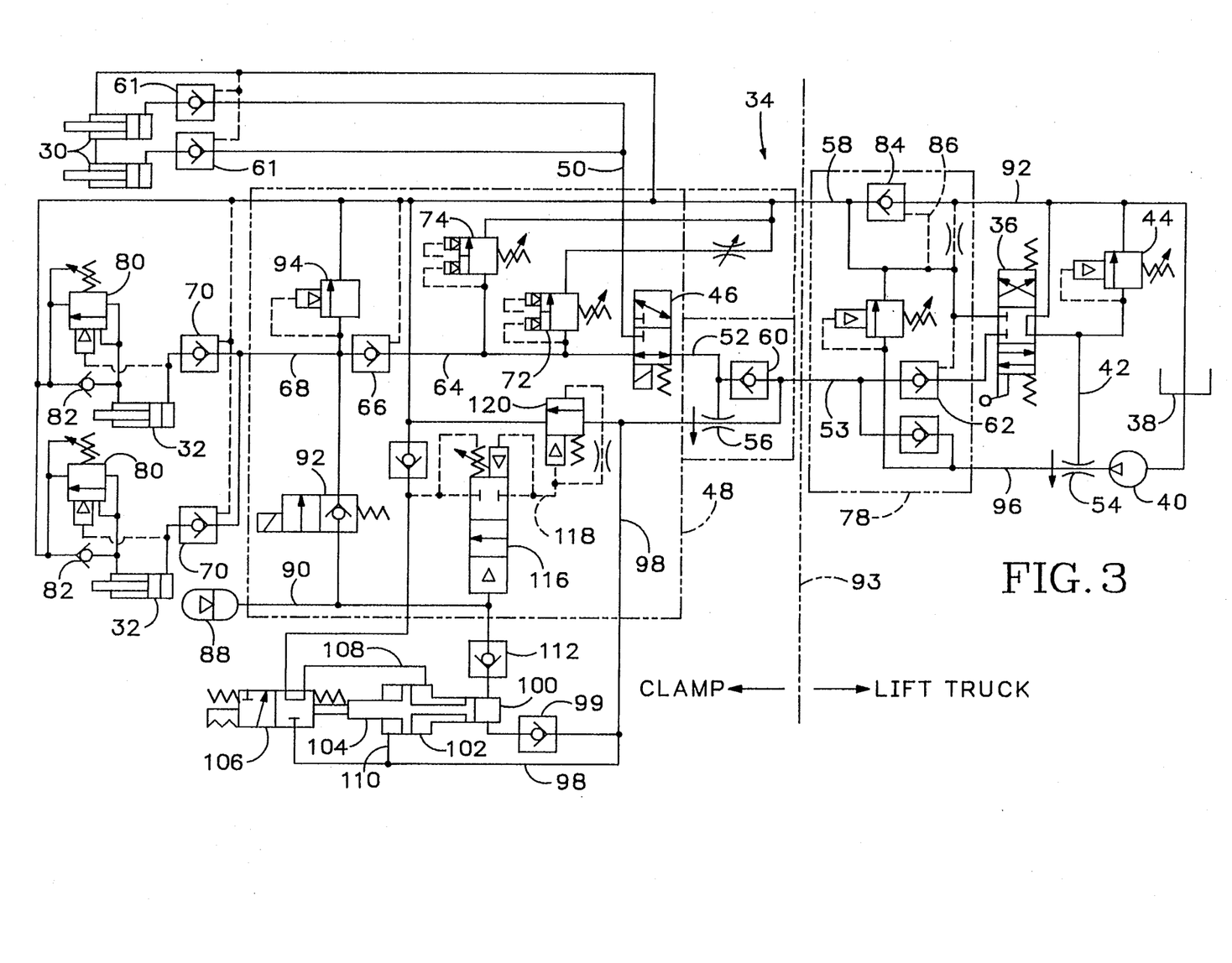
FIG. 3 is a schematic diagram of an exemplary hydraulic circuit for the clamp of FIG. 1.

With references to FIGS. 2 and 3, each of the clamp arms 20 and 22 is rotatable about its respective pivot pins 26, 28 selectively toward or away from the other clamp arm by the selective extension or retraction of respective pairs of hydraulic cylinders 30 and 32 associated with the respective arms 20 and 22. With reference to FIG. 3, both pairs of hydraulic cylinders 30 and 32 are controlled through hydraulic circuitry indicated generally as 34 in response to an operator-controlled valve 36 mounted on the lift truck, which receives pressured hydraulic fluid from the lift truck's reservoir 38 through a pump 40 and supply conduit 42. Safety relief valves 44 and 45 open to shunt fluid back to the reservoir 38 if excessive pressure develops in the system.

The cylinders 30 which actuate the shorter clamp arm 20 are primarily used only to position the clamp arm 20 in advance for carrying rolls such as 12 of differing diameters in different desired lateral positions. To change the position of the clamp arm 20 a solenoid valve 46, which is part of a valve assembly 48 mounted on the load clamp 10, is actuated by the operator out of its normally unactuated condition shown in FIG. 3 to place the conduit 50 in communication with the conduit 52. If it is desired to extend the cylinders 30, the operator then moves valve 36 in a direction to place conduit 53 in communication with supply conduit 42, which receives fluid from the pump 40 through a flow divider 54 and delivers it through conduit 53 and flow divider 56 to conduit 52. Such fluid flows through valve 46 to conduit 50 and extends the cylinders 30, which simultaneously exhaust fluid from the opposite sides of their pistons through a fluid conduit 58 and valve 36 to the lift truck reservoir 38. Alternatively, if it is desired to retract cylinders 30, the operator moves valve 36 in the opposite direction so as to place conduit 58 in communication with supply conduit 42, thereby feeding pressurized fluid through conduit 58 to the opposite ends of the cylinders 30. The pressure in line 58 applied through pilot line 86 closes check valve 84 to prevent any of the pressurized fluid in line 58 from being exhausted through the check valve to the reservoir 38. The pressure in line 58 also unseats pilot-operated check valves 61 so that fluid is exhausted from the cylinders 30 through line 50, valve 46, line 52, check valve 60, line 53, pilot-operated check valve 62 (which is also unseated by the pressure in line 58), and valve 36 to the reservoir 38. Thereafter, with the clamp arm 20 in the appropriate position to place the paper roll 12 in the desired lateral location, the clamp 10 is ready to engage the paper roll.

Operator-controlled gripping of the paper roll 12 first requires that solenoid valve 46 be deactivated so that its spool is returned to its normal unactuated position shown in FIG. 3 placing conduit 64, rather than conduit 50, in communication with conduit 52. To grip the roll, the operator moves the valve 36 to place conduit 53 in communication with supply conduit 42 to thereby supply fluid through valve 46 to conduit 64 and through pilot-operated check valve 66, conduit 68, and further pilot-operated check valves 70 to extend cylinders 32. This increases the proximity of the load-engaging surface 16 relative to the load-engaging surface 14. A kick-down relief valve 72 limits the initial clamping pressure to a predetermined level (for example 800 psi) which is significantly less than the limit imposed by the lift truck's safety relief valve 44 (which preferably should be set, for example, to open at 2,000 psi). A second kick-down relief valve 74 may optionally be provided in parallel with relief valve 72 having a higher relief setting (for example 1200 psi). If two such relief valves 72 and 74 are provided, the valve 72 having the lower setting limits the initial clamping pressure when the load-engaging surfaces 14 and 16 are in a vertical orientation, and the valve 74 having the higher setting limits the initial clamping pressure when the load-engaging surfaces have been rotated to a horizontal orientation by the rotator 18. In such case, the valve assembly 48 contains a valve (not shown) responsive to the rotational orientation of the rotator 18 to determine which of the two valves 72, 74 is operable to exhaust fluid to the conduit 58 for purposes of limiting the initial clamping pressure.

As pressurized fluid is supplied through conduit 64 and conduit 68 to extend the cylinders 32 to grip the paper roll, fluid is simultaneously exhausted from the opposite ends of the cylinders 32 through counterbalance valves 80, conduit 58 and valve 36 to the reservoir 38. The counterbalance valves 80 are provided to prevent overrunning extension of the cylinders 32 when the load-engaging surface 16 has been rotated by the rotator 18 to an upper horizontal orientation where gravity tends to pull the arm 22 downwardly, thereby tending to extend the cylinders 32 when no load is engaged.

When the operator wishes to release the grip on the paper roll 12, he moves the valve 36 in the opposite direction to place. the conduit 58 in communication with the conduit 42, thereby supplying pressurized fluid through check valves 82 to retract the cylinders 32. Fluid is simultaneously exhausted from the cylinders 32 through pilot-operated check valves 70 and 66 (which are unseated by the pressure in conduit 58), valve 46, line 52, check valve 60, line 53, pilot-operated check valve 62 (likewise unseated by the pressure in conduit 58), and valve 36 to reservoir 38.

A hydraulic accumulator 88, storing fluid at a pressure significantly higher than that produced by the pump 40, is mounted on the clamp 10 as shown in FIG. 1 in close proximity to the cylinders 32 to maximize the speed of automatic slippage correction. The outlet 90 of the accumulator is connected to line 68 through a normally closed solenoid valve 92 which selectively permits or prevents the flow of fluid from the outlet 90 to the cylinders 32 for extending them. In response to the sensing of slippage of the load 12 relative to the load-engaging surfaces by means to be described hereafter, the valve 92 is automatically actuated only for a predetermined time period to open it and permit a limited volume of fluid from the accumulator 88 to flow to the cylinders 32 to increase the grip on the load 12 and thereby correct the slippage. When fluid is flowing from the accumulator 88 through the valve 92 and conduit 68 to the cylinders 32, pilot-operated check valve 66 prevents any accumulator fluid from also flowing into the conduit 64 and thus into the operator-controlled portions of the hydraulic circuit 34, to prevent any of the accumulator energy from being wastefully absorbed or exhausted by such operator-controlled portions.

During the limited time duration when the solenoid valve 92 is open to increase the grip on the load 12, fluid is simultaneously exhausted from the opposite sides of the cylinders 32 through the counter-balance valves 80 to line 58. Because the operator-controlled valve 36 is closed during such automatic slippage correction, the fluid from line 58 cannot be exhausted to the reservoir 38 through the valve 36. However, the conduit 58 is nevertheless able to perform the exhaust function during automatic slippage correction despite the closure of valve 36 by virtue of fluid conduit 92, which can exhaust fluid to the reservoir 38 in parallel with valve 36 since pilot-operated check valve 84 permits free oil flow when the pressure in conduit 58 is low due to its disconnection from the supply conduit 42. The ability to use a single common conduit 58 for fluid exhaust under both the operator-controlled condition and the automatic slip-correcting condition is important in a lift truck-mounted clamp because it minimizes the number of hydraulic conduits which must communicate between the lift truck (located to the right of the phantom line 93 in FIG. 3) and the vertically-reciprocating clamp 10 on the lift truck mast (located to the left of the line 93).

The opening of the solenoid valve 92 only for a predetermined duration in response to the sensing of slippage limits the increase in proximity of the load-engaging surface 16 with respect to the surface 14 by a predetermined distance due to the limited volume of fluid permitted to pass through the valve 92. Thus, it is possible to expose the cylinders 32 to the full pressure of the accumulator 88 without risking damage to the load because of the limited clamp closure allowed. Under normal circumstances, no accumulator fluid need be exhausted through a relief valve to limit the pressure to which the cylinders 32 are exposed during slippage correction, which both maximizes the mechanical speed with which the load-engaging surfaces correct the slip, and conserves accumulator energy. A slippage-correction safety relief valve 94 with a high relief-pressure setting is provided only to relieve an exceptionally high pressure condition.

Because it is important to maintain the accumulator 88 at a high energy level to maximize the speed of automatic slippage correction, a continuously automatic accumulator recharging system is provided which is capable of recharging the accumulator automatically in response to the depletion of fluid, and thus energy, in the accumulator regardless of whether or not the operator-controlled valve 36 is actuated. Continuously automatic accumulator recharging, regardless of the condition of the valve 36, is accomplished by providing a small amount of flow (approximately ½ gallon per minute) from the pump 40 through flow divider 54 and conduit 96 in parallel with the valve 36 to the conduit 53, from which it flows through a second flow divider 56 to a conduit 98 for charging the accumulator 88. The dual flow dividers 54, 56 enable the common use of the single conduit 53 both for operator-controlled supply of fluid to the cylinders and for automatically-controlled fluid recharging of the accumulator 88, thus further minimizing the number of hydraulic conduits which are required to pass from the lift truck to the vertically-reciprocating clamp 10. Accumulator recharging fluid flowing into conduit 98 is introduced through a check valve 99 into a chamber 100 of a pressure intensifier 102 when the spool of a detent valve 106 is in its right-hand position in FIG. 3 (i.e., opposite to the position shown in FIG. 3). The pressure in line 98 is thereby effectively distributed through check valve 99, and through valve 106 and line 108, over a larger effective area on the right-hand side of the piston assembly 104 than on the left-hand side through line 110. The resultant force imbalance pushes the piston assembly 104 to the left in FIG. 3 and permits fluid from conduit 98 to enter chamber 100. When the piston assembly 104 reaches the limit of its movement to the left, it pushes the spool of detent valve 106 to its position as shown in FIG. 3, disconnecting conduit 108 from conduit 98 and permitting conduit 108 to exhaust fluid to conduit 58. This reverses the imbalance of force on the piston assembly 104 since the pressure in conduit 98 is now distributed over a smaller effective area on the right side of the piston assembly than on the left side through conduit 110. Accordingly the piston assembly 104 moves to the right in FIG. 3, forcing the fluid in chamber 100 through check valve 112 and outlet 90 into the accumulator 88 while, due to the effective area differential between the opposite sides of the piston assembly 104, also amplifying the pressure of the fluid in chamber 100 from its original line pressure created by the pump 40 to an accumulator pressure of approximately 4500 psi. This not only produces a very high level of potential energy in the accumulator for quick slippage correction, but also insures that the power draw on the pump 40 during slippage correction is kept at a low enough level to avoid stalling the lift truck engine. When the piston assembly 104 reaches the limit of its movement to the right, it pulls the valve 106 to the right in FIG. 3, once again reversing the imbalance of force on the piston assembly, and the foregoing process is repeated continuously to charge the accumulator 88 until such time as the accumulator pressure reaches a predetermined maximum charging level. When that happens the accumulator pressure is sufficient, acting through conduit 90, to open valve 116 thereby relieving the pressure in pilot line 118 and permitting the pressure in conduit 98 to open valve 120. This exhausts the fluid in conduit 98 through line 58 to the reservoir 38 until such time as the pressure in accumulator 88 is reduced to the point where valve 116 once again closes, resulting in the closure of valve 120 which causes the recharging of the accumulator 88 through conduit 98 to resume.

Figure 7:
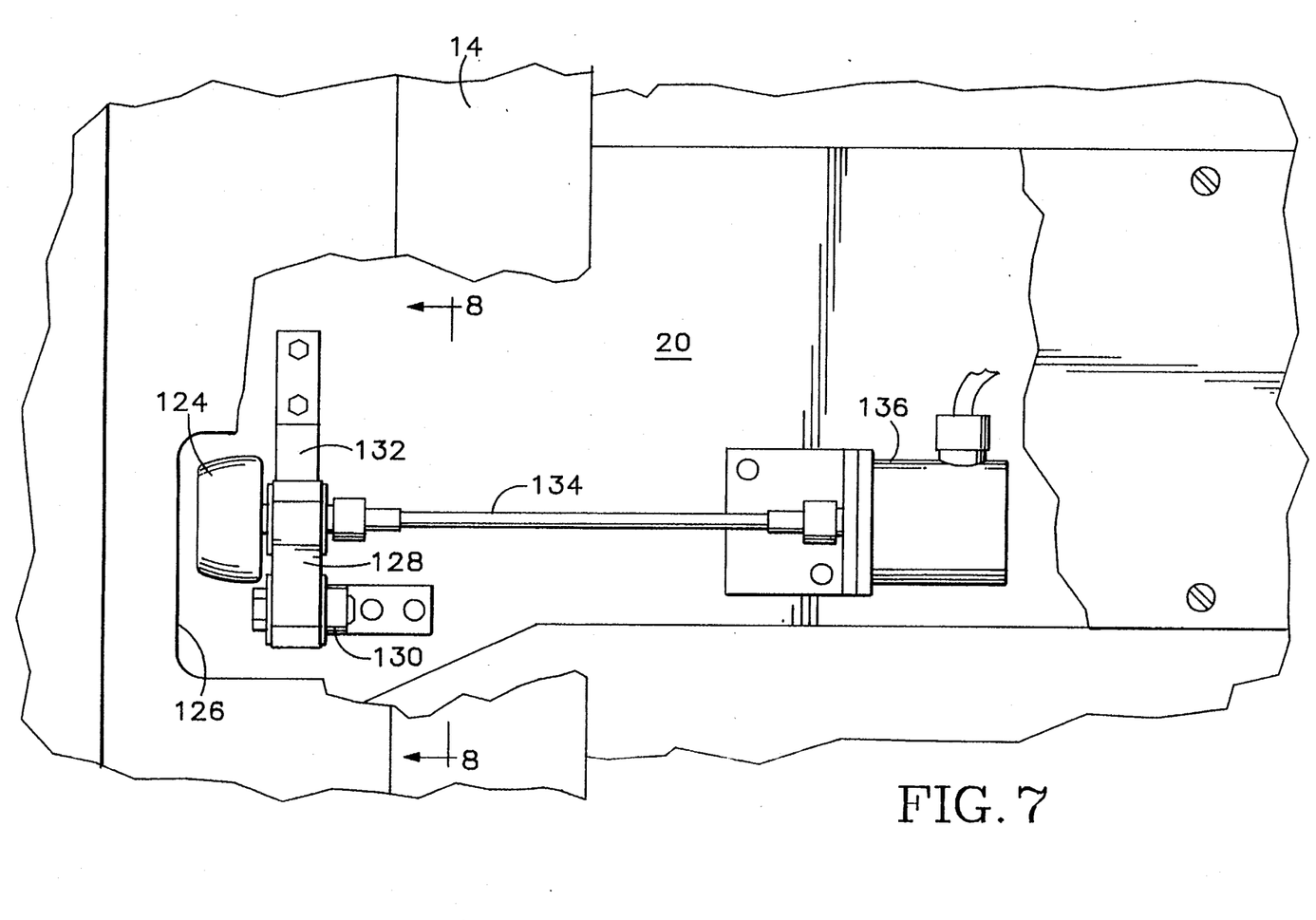
FIG. 7 is an enlarged, partially broken away view of the slippage transducer employed in the load handling clamp, taken along line 7—7 of FIG. 2.
Figure 8:
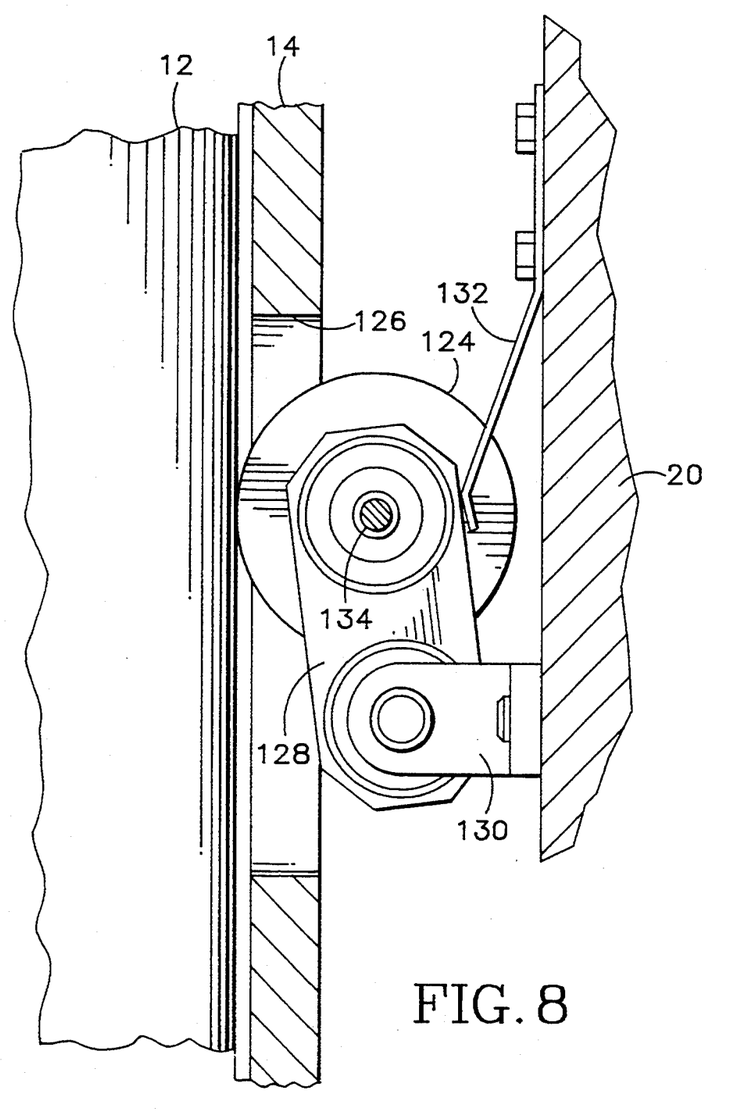
FIG. 8 is a sectional view taken along line 8—8 of FIG. 7.

The actuation of solenoid valve 92 only for a predetermined period of time automatically in response to slippage of the load 12 is controlled by a slippage sensor which includes a slippage transducer and electrical data processing and control circuitry. The slippage transducer comprises a load contact roller 124 protruding through an aperture 126 in the load-engaging surface 14 as shown in FIG. 1. With reference to FIGS. 7 and 8, the roller 124 is rotatably journaled on a pivot arm 128 which is pivotally attached by a clevis 130 to the inside of the clamp arm 20. A leaf spring 132 also mounted to the clamp arm 20 urges the pivot arm 128 resiliently toward the surface of the load 12 so that any vertical movement of the load 12 relative to the surface 14 frictionally rotates the contact roller 124. Rotation of the roller 124 is transmitted through a flexible connector 134 (similar to a speedometer cable) to a rotary incremental optical encoder 136 which produces digital pulses at a frequency proportional to the rate of rotation of the roller 124, which in turn is proportional to the velocity of any vertical slippage movement of the load 12 relative to the load-engaging surface 14. The rotary encoder 136 is mounted on the interior of the clamp arm 20 at a location sufficiently remote from the contact roller 124 that the flexible connector 134 isolates the encoder 136 from shocks imposed by the load 12 on the contact roller 124.

Figures 4, 4A:
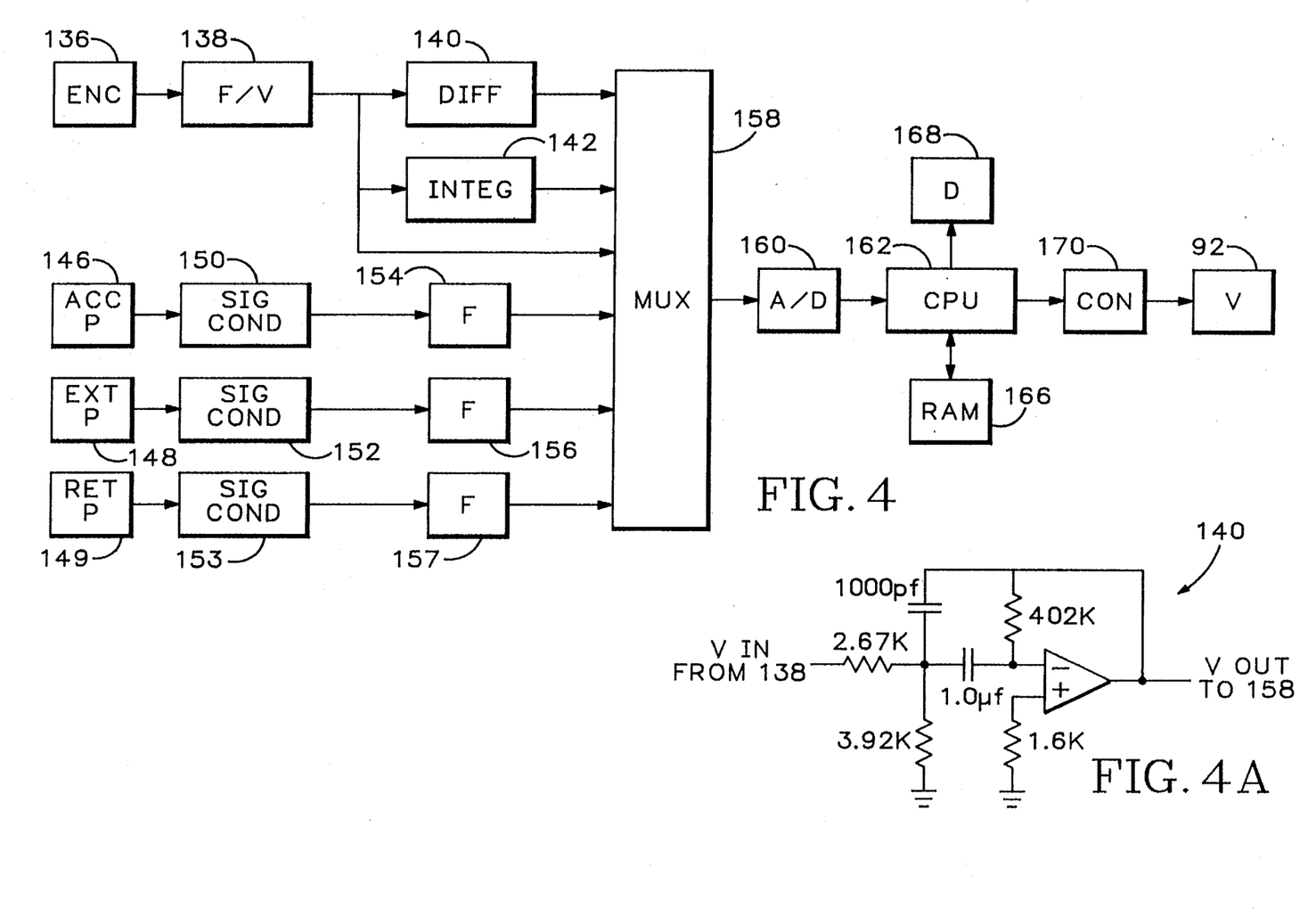
FIG. 4 is a simplified schematic diagram of an electrical circuit for the clamp of FIG. 1.
FIG. 4A is a detailed circuit diagram for a portion of the circuit of FIG. 4.

With reference to FIG. 4, the rotary encoder 136 delivers its pulses to a conventional frequency-to-analog voltage converter 138 to produce a voltage output proportional to slippage velocity. The voltage output of the converter 138 is supplied to an analog differentiator 140, to be described hereafter, to produce a voltage output signal proportional to slippage acceleration. The output of the converter 138 can optionally also be supplied to an analog integrator 142 to produce a voltage output signal proportional to the slippage distance, and/or used directly as a voltage representative of slippage velocity if desired. Although each of these three signals is indicative of the magnitude of slippage, preferably only the acceleration output from the differentiator 140 is used for slippage correction because it provides the earliest indication of slippage magnitude. The other outputs can be used if desired to indicate and display any failure in the system permitting excessive slippage displacement and/or velocity.

FIG. 4A depicts schematically the components of the analog differentiator 140. Such an analog differentiator is preferable to a digital differentiator in the present application because it is faster. A major drawback of a digital differentiator in a system of this type is that it must take two consecutive velocity signal samples separated by a sampling time period and divide the difference by the sampling period to yield an accurate acceleration signal. The sampling period must be sufficiently wide to allow for a change in the velocity signal greater than the minimum resolution of the system. Because speed of slip correction is a critical requirement in the system of the present invention, it is desirable to eliminate the need for such a sampling period. In order to do so, it is necessary to perform the differentiating function in an analog circuit rather than a digital circuit. However, analog circuits traditionally make poor differentiators because an ideal differentiator should have a gain which increases continuously with frequency, meaning that at high frequencies the gain would also be very high amplifying stray noise and overriding the signal of interest. Nevertheless, by recognizing that the present system can operate at a lower range of frequencies, an analog differentiator can be designed to operate without significant noise over the operational frequency range and suppress signals at higher frequencies. Since the operational frequency of a clamp such as 10 is very low, an analog differentiator is employed successfully by using a bandpass filter. In the operational frequency domain, the gain of the bandpass filter can rise on an increasing slope of 20 dB per decade from zero HZ to 200 HZ as an ideal differentiator. A second order real pole at 200 HZ will roll off the gain without any peaking and it will then decrease on a slope of minus 20 dB per decade. High-frequency noise will thus be suppressed. Such a bandpass filter can be realized in an active single-stage multiple feedback differentiator as shown in FIG. 4A. The operational amplifier shown in FIG. 4A is selected for low offset voltage, low input bias current and low noise. Using conventionally selected component values as shown, the circuit of FIG. 4A has a gain of unity, a damping ratio of unity which yields no peaking at the corner frequency, and an undamped natural frequency of 200 HZ which is the corner frequency of the bandpass filter.

The acceleration output of the differentiator 140 is used to variably predetermine the duration of actuation of the solenoid valve 92 in a manner to be described hereafter, thereby variably predetermining the increase in the grip by variably predetermining the volume of fluid fed to the cylinders 32 and thereby setting the distance by which the cylinders 32 extend. This limits the increase in the proximity of the load-engaging surfaces to a predetermined distance variably responsive to the magnitude of the slippage.

In addition to the magnitude of slippage indicated by the slippage acceleration, signals are also obtained from a pressure sensor 146 which measures the pressure within accumulator 88, a pressure sensor 148 which measures the pressure within cylinders 32 tending to extend them, and a pressure sensor 149 which measures the pressure within cylinders 32 tending to retract them. Signals from the pressure sensors 146, 148 and 149 are fed through respective signal conditioners 150, 152, 153 and filters 154, 156, 157.

The differential between the resultant analog voltage outputs of pressure sensors 146 and 148 is used to influence the duration during which the valve 92 is actuated. This is because the pressure differential variably affects the volumetric flow of fluid through the valve 92 while it is opened. On the other hand, the differential between the outputs of pressure sensors 148 and 149 is used to determine whether a load has been clamped, which is indicated preferably by a differential of at least 300 psi in favor of pressure sensor 148.

Figure 5A:
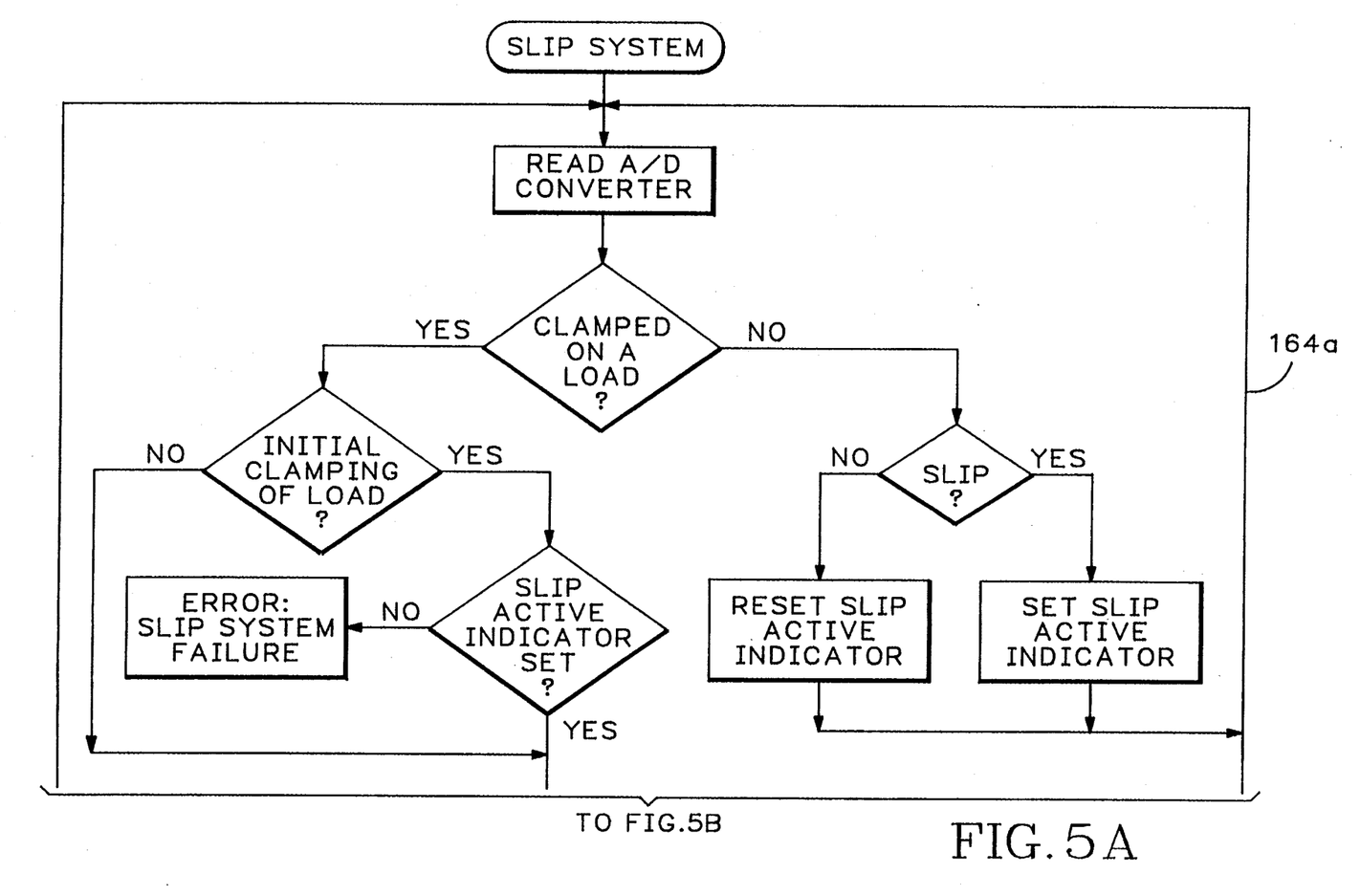
FIGS. 5A and 5B are an exemplary logic flow diagram for the microprocessor used in the circuit of FIG. 4.
Figure 5B:
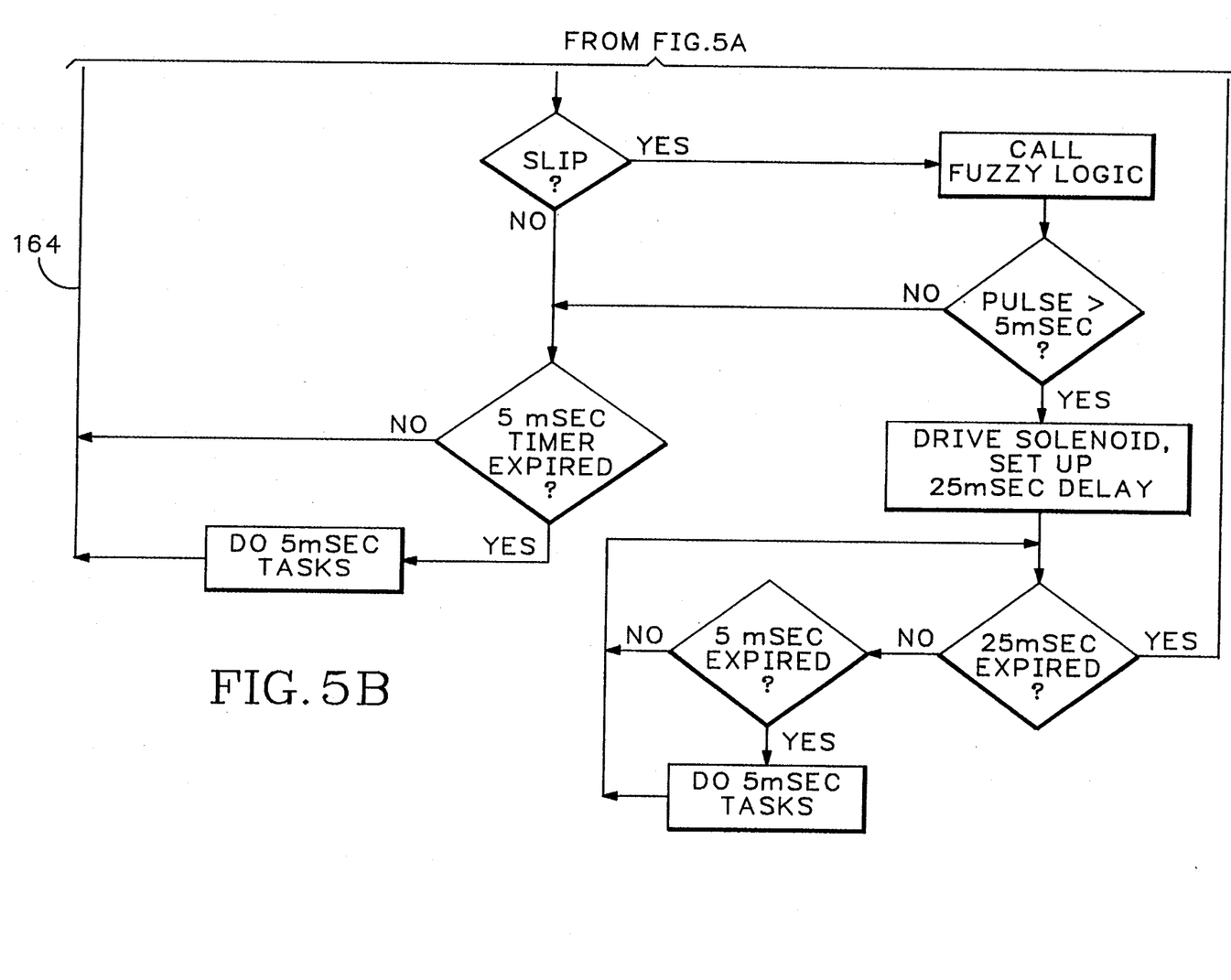

The above-described acceleration and pressure differential voltage signals are delivered through a multiplexer 158 and analog-to-digital converter 160 to a CPU 162, such as a Motorola Model 68HC11 microprocessor. With reference to the logic flow diagram of FIG. 5, the initial functions of the CPU are to prevent slip correction before the load has actually been clamped, and to test the operability of the slip-sensing system. Because the load contact roller 124 is journaled on a pivot arm 128, the initial clamping of the load necessitates contact of the roller 124 with the load surface and subsequent arcuate movement of the roller axis as the arm 128 pivots toward the leaf spring 132. This causes a small amount of roller rotation as the clamp arm 20 approaches the surface of the load. However, since the load has not yet been clamped, any opening of the valve 92 to correct for slippage in response to rotation of the roller 124 would be premature. Therefore the CPU, sensing that clamping has not yet occurred because of an insufficient pressure differential between pressure sensors 148 and 149, temporarily prevents the system from opening valve 92 in response to the rotation of roller 124. Nevertheless, as shown in FIG. 5, the CPU does use this initial rotation of the roller 124 to test the operability of the slip-sensing system by setting a "slip active" indicator in response to sensed rotation prior to load clamping. In contradistinction, if no rotation of the roller is sensed prior to load clamping, the "slip active" indicator is not set. Later, when clamping of the load is initially indicated by a sufficient pressure differential between the pressure sensors 148 and 149, the CPU immediately requires that the "slip active" indicator have been previously set, indicating operability of the slip-sensing system, or an error signal is transmitted.

Figure 6:
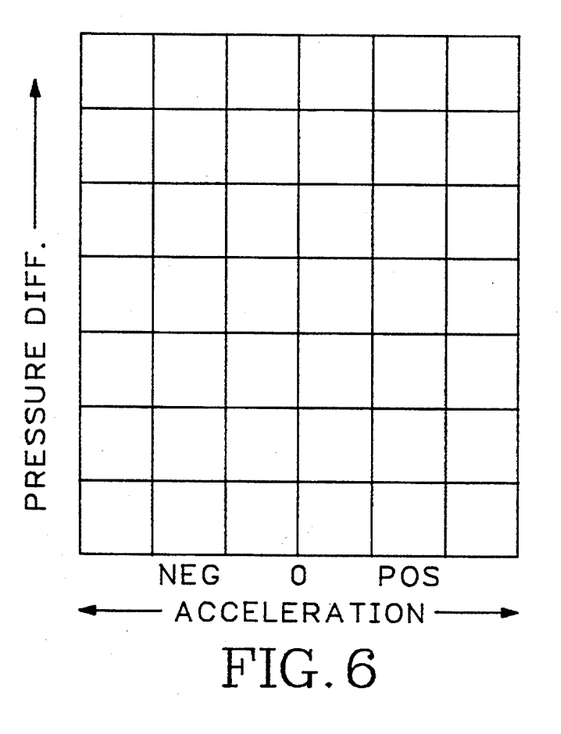
FIG. 6 is a schematic diagram illustrating a portion of the diagram of FIG. 5.

The detection of rotation of the roller 124, both before and after initial clamping of the load, is performed by sampling the output of the encoder 136, preferably at a rate greater than every one millisecond to determine whether slippage acceleration is other than zero, thereby indicating the existence of slip. This initial sampling routine is indicated by the loops 164 and 164a of FIG. 5, wherein the "5mSEC tasks" include updating the RAM 166 and display 168. When the existence of slippage is indicated, the acceleration and pressure differential signals, respectively, are applied to a fuzzy logic look-up table matrix in the CPU, exemplified by FIG. 6. Although FIG. 6 shows a two-dimensional matrix, other signals such as slippage velocity could conceivably be used in matrices of more dimensions, but at the expense of speed. Each block of the matrix of FIG. 6 represents a particular predetermined time duration for the actuation, and thereby opening, of the valve 92. In general, the matrix is constructed so that higher positive slippage acceleration and lower pressure differentials tend to increase the duration for opening the valve 92. On the other hand, higher negative slippage acceleration (i.e. deceleration) and higher pressure differential signals tend to lower the duration for opening the valve 92.

Returning to FIG. 5, if the predetermined time duration for opening the valve 92 resulting from the analysis of FIG. 6 is equal to or less than five milliseconds, the valve is not actuated because it cannot physically be activated and deactivated within such a short time period. However, if the duration for activating the valve 92 is greater than five milliseconds, the valve is opened by actuating its solenoid through conventional control circuitry 170 for the predetermined duration, and is then deactivated to close the valve at the end of the duration, thereby limiting the extension of the cylinders and the increase in proximity of the load-engaging surfaces by a predetermined distance. After actuation of the valve 92, no further readings are accepted for analysis in the fuzzy logic system until 25 milliseconds have expired. Thereafter the fuzzy logic analysis and actuation of the valve 92 can be repeated if further slip is detected. A suitable range of time periods for actuating the valve 92 for a paper roll clamp such as that shown in the figures is approximately 5.5 to 10 milliseconds, depending upon the sensed magnitude of slippage.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of gripping a load between a selectively closable and openable pair of load-engaging surfaces, said method comprising:
   (a) providing at least one power actuator for increasing the proximity of said pair of load-engaging surfaces relative to each other to increase the grip imposed by said surfaces on said load;
   (b) while said surfaces are gripping said load, variably sensing a magnitude of relative movement between said load and said surfaces;
   (c) immediately in response to said magnitude of relative movement sensed in step (b) and during not more than a beginning portion, less than all, of said relative movement, variably determining a variable increase in said grip dependent upon said magnitude of relative movement sensed in step (b); and
   (d) immediately in response to step (c), causing said actuator to effect said increase in said grip.

2. The method of claim 1 wherein step (b) includes determining a time rate of said relative movement.

3. The method of claim 2 wherein said time rate of said relative movement is the acceleration of said relative movement.

4. The method of claim 1 wherein step (c) comprises variably effecting an increase in said proximity of said pair of load-engaging surfaces while limiting said increase by a predetermined distance variably dependent upon said magnitude of relative movement.

5. The method of claim 1 wherein step (b) includes sensing two different variables of different types, and step (d) comprises operating said actuator variably depending upon said two different variables.

6. A method of gripping a load between a selectively closable and openable pair of load-engaging surfaces, said method comprising:
   (a) providing at least one power actuator for increasing the proximity of said pair of load-engaging surfaces relative to each other to increase the grip imposed by said surfaces on said load;
   (b) while said surfaces are gripping said load, determining a variable time rate of relative movement between said load and said surfaces; and
   (c) variably causing said actuator to effect an increase in said grip variably dependent upon said time rate of relative movement determined in step (b).

7. The method of claim 6 wherein said variable time rate of said relative movement is the acceleration of said relative movement.

8. The method of claim 6 wherein step (c) comprises variably causing said actuator to effect an increase in the proximity of said pair of load-engaging surfaces while limiting said increase by a predetermined distance variably dependent upon said time rate of relative movement.

9. A method of gripping a load between a selectively closable and openable pair of load-engaging surface, said method comprising:
   (a) providing at least one power actuator for increasing the proximity of said pair of load-engaging surfaces relative to each other to increase the grip imposed by said surfaces on said load.
   (b) while said surfaces are gripping said load, sensing the existence of slippage between said load and said surfaces including variably determining a magnitude of said slippage; and
   (c) in response to said sensing in step (b), causing said actuator to effect an increase in proximity of said load-engaging surfaces while variably limiting said increase in proximity by a predetermined distance variably dependent upon said magnitude of said slippage.

10. The method of claim 9 wherein step (c) comprises limiting said increase in proximity by a predetermined distance irrespective of any increase, within a predetermined limit, of the force with which said load-engaging surfaces grip said load.

11. The method of claim 9 wherein said magnitude of said slippage is a magnitude of relative movement between said load and said surfaces.

12. The method of claim 11 wherein said magnitude of relative movement is a variable time rate of said relative movement.

13. The method of claim 12 wherein said time rate of said relative movement is the acceleration of said relative movement.

14. A method of gripping a load between a selectively closable and openable pair of load-engaging surfaces, said method comprising:
(a) providing at least one power actuator for increasing the proximity of said pair of load-engaging surfaces relative to each other to increase the grip imposed by said surfaces on said load;
(b) while said surfaces are gripping said load, operating a sensor to sense the existence of slippage between said load and said surfaces;
(c) in response to the existence of slippage between said load and said surfaces as sensed in step (b), causing said actuator to effect an increase in proximity of said load-engaging surfaces; and
(d) prior to gripping said load, testing said sensor automatically in response to said load being approached by at least one of said load-engaging surfaces to determine whether said sensor is operable, and indicating any inoperability of said sensor automatically in response to said testing.

15. A load-handling clamp having selectively closable and openable load-engaging surfaces for selectively gripping and releasing a load positioned between said surfaces, said clamp comprising:
(a) at least one fluid power actuator for increasing the proximity of said pair of load-engaging surfaces relative to each other to increase the grip imposed by said surfaces on said load;
(b) a pressurized fluid accumulator having an outlet interconnected with said actuator through a selectively openable and closable valve for selectively permitting or preventing a flow of fluid from said outlet to said actuator for causing said actuator to increase said proximity; and
(c) a sensor for sensing the existence of slippage between said load and said surfaces and for selectively opening said valve only for a predetermined time period in response to the sensing of said slippage to permit said flow of fluid.

16. The apparatus of claim 15 wherein said sensor includes means for sensing the magnitude of said slippage between said load and said surfaces, and for varying said predetermined time period in response to said magnitude.

17. A load-handling clamp having selectively closable and openable load-engaging surfaces for selectively gripping and releasing a load positioned between said surfaces, said clamp comprising:
(a) at least one fluid power actuator for increasing the proximity of said pair of load-engaging surfaces relative to each other to increase the grip imposed by said surfaces on said load;
(b) a pressurized fluid accumulator having an outlet interconnected with said actuator through a selectively openable and closable valve for selectively permitting or preventing a flow of fluid from said outlet to said actuator for causing said actuator to increase said proximity;
(c) a sensor for sensing the existence of slippage between said load and said surfaces, and for selectively opening said valve in response to the sensing of said slippage to permit said flow of fluid; and
(d) accumulator fluid recharging circuitry for introducing fluid into said accumulator automatically in response to the depletion of fluid in said accumulator.

18. The apparatus of claim 17, including a sensor for sensing a pressure differential between said accumulator and said fluid power actuator and variably controlling the time during which said valve is open in response to said pressure differential.

19. A load-handling clamp having selectively closable and openable load-engaging surfaces for selectively gripping and releasing a load positioned between said surfaces, said clamp comprising:
(a) at least one fluid power actuator for increasing the proximity of said pair of load-engaging surfaces relative to each other to increase the grip imposed by said surfaces on said load;
(b) a pressurized fluid accumulator having an outlet interconnected with said actuator through a selectively openable and closable valve for selectively permitting or preventing a flow of fluid from said outlet to said actuator for causing said actuator to increase said proximity;
(c) a sensor for sensing the existence of slippage between said load and said surfaces, and for selectively opening said valve in response to the sensing of said slippage to permit said flow of fluid; and
(d) accumulator fluid recharging circuitry for introducing fluid into said accumulator, said fluid recharging circuitry including a pump for supplying fluid to said accumulator and a pressure intensifier interposed between said pump and said accumulator for increasing the pressure of the fluid supplied by said pump to said accumulator.

20. A load-handling clamp having selectively closable and openable load-engaging surfaces for selectively gripping and releasing a load positioned between said surfaces, said clamp comprising:
(a) at least one fluid power actuator for increasing the proximity of said pair of load-engaging surfaces relative to each other to increase the grip imposed by said surfaces on said load;
(b) a pressurized fluid accumulator having an outlet interconnected with said actuator through a selectively openable and closable valve for selectively permitting or preventing a flow of fluid from said outlet to said actuator for causing said actuator to increase said proximity;
(c) a sensor for sensing the existence of slippage between said load and said surfaces, and for selectively opening said valve in response to the sensing of said slippage to permit said flow of fluid;
(d) a fluid conduit for conducting fluid to said actuator in parallel with said outlet of said accumulator for causing said actuator to increase said proximity of said pair of load-engaging surfaces; and
(e) fluid circuitry preventing said flow of fluid from said outlet from flowing into said fluid conduit.

21. The apparatus of claim 20, including further fluid circuitry for conducting fluid from said fluid conduit into said accumulator.

22. A load-handling clamp having selectively closable and openable load-engaging surfaces for selectively gripping and releasing a load positioned between said surfaces, said clamp comprising:

(a) at least one fluid power actuator for increasing the proximity of said pair of load-engaging surfaces relative to each other to increase the grip imposed by said surfaces on said load;

(b) a pressurized fluid accumulator having an outlet interconnected with said actuator through a selectively openable and closable valve for selectively permitting or preventing a flow of fluid from said outlet to said actuator for causing said actuator to increase said proximity;

(c) a sensor for sensing the existence of slippage between said load and said surfaces, and for selectively opening said valve in response to the sensing of said slippage to permit said flow of fluid;

(d) a first fluid conduit for conducting fluid to said actuator in parallel with said outlet of said accumulator for causing said actuator to increase said proximity of said pair of load-engaging surfaces;

(e) a selectively openable and closable operator-controlled valve interposed in said first fluid conduit; and (f) a second fluid conduit interconnected with said first fluid conduit in parallel with said operator-controlled valve for supplying fluid through said first fluid conduit to said accumulator despite the closure of said operator-controlled valve.

23. A load-handling clamp having selectively closable and openable load-engaging surfaces for selectively gripping and releasing a load positioned between said surfaces, said clamp comprising:

(a) at least one fluid power actuator for increasing the proximity of said pair of load-engaging surfaces relative to each other to increase the grip imposed by said surfaces on said load;

(b) a first fluid conduit connected to said fluid power actuator for conducting a pressurized supply of fluid thereto for causing said actuator to increase said proximity of said pair of load-engaging surfaces;

(c) a selectively operable valve for controlling said pressurized supply of fluid in said first fluid conduit;

(d) a sensor for sensing the existence of slippage between said load and said surfaces, and for controlling said valve in response thereto;

(e) a second fluid conduit connected to said fluid power actuator for exhausting fluid therefrom while said first fluid conduit conducts fluid to said actuator;

(f) a selectively openable and closable operator-controlled valve interposed in said second fluid conduit; and (g) a third fluid conduit interconnected with said second fluid conduit in parallel with said operator-controlled valve for exhausting fluid from said second fluid conduit despite the closure of said operator-controlled valve.

24. A load-handling clamp having selectively closable and openable load-engaging surfaces for selectively gripping and releasing a load positioned between said surfaces, said clamp comprising:

(a) at least one power actuator for increasing the proximity of said pair of load-engaging surfaces relative to each other to increase the grip imposed by said surfaces on said load;

(b) a slippage transducer mounted on at least one of said surfaces for sensing the existence of slippage between said load and said one of said surfaces;

(c) said slippage transducer comprising a rotatable contact member for contacting said load, and an electrical signal-producing encoder separate from said contact member mounted rotatably on said clamp in a location remote from said contact member and connected mechanically to said contact member by flexible connector means for transmitting rotary motion from said contact member to said encoder and thereby causing said contact member and said encoder to rotate in unison with each other.

25. A method of gripping a load between a selectively closable and openable pair of load-engaging surfaces, said method comprising:

(a) providing at least one power actuator for increasing the proximity of said pair of load-engaging surfaces relative to each other to increase the grip imposed by said surfaces on said load;

(b) while said surfaces are gripping said load, variably sensing a magnitude of acceleration of relative movement between said load and said surfaces;

(c) immediately in response to said magnitude of acceleration sensed in step (b), variably determining a variable increase in said grip dependent upon said magnitude of acceleration sensed in step (b); and (d) immediately in response to step (c), causing said actuator to effect said increase in said grip.

26. A method of gripping a load between a selectively closable and openable pair of load-engaging surfaces, said method comprising:

(a) providing at least one power actuator for increasing the proximity of said pair of load-engaging surfaces relative to each other to increase the grip imposed by said surfaces on said load;

(b) while said surfaces are gripping said load, sensing a variable acceleration of relative movement between said load and said surfaces; and (c) variably causing said actuator to effect an increase in said grip variably dependent upon said acceleration of relative movement sensed in step (b).

27. A method of gripping a load between a selectively closable and openable pair of load-engaging surfaces, said method comprising:

(a) providing at least one power actuator for increasing the proximity of said pair of load-engaging surfaces relative to each other to increase the grip imposed by said surfaces on said load;

(b) while said surfaces are gripping said load, sensing the existence of slippage between said load and said surfaces by variably sensing a magnitude of acceleration of relative movement between said load and said surfaces; and (c) in response to said sensing in step (b), causing said actuator to effect an increase in proximity of said load-engaging surfaces while limiting said increase in proximity by a predetermined distance variably dependent upon said magnitude of acceleration.

28. The method of claim 27 wherein step (c) comprises limiting said increase in proximity by said predetermined distance irrespective of any increase, within a predetermined limit, of the force with which said load-engaging surfaces grip said load.

* * * * *